Figure 1:
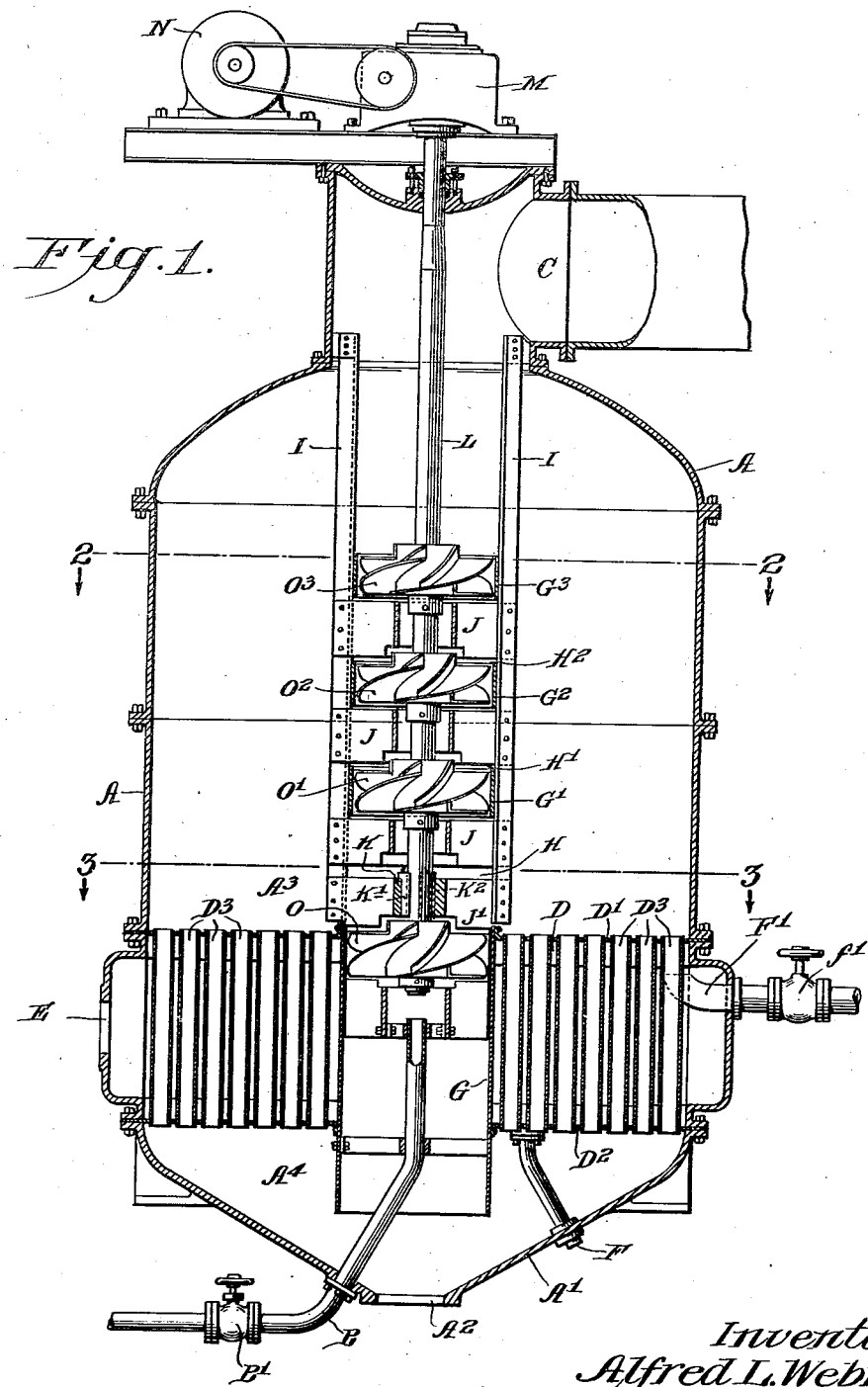

May 8, 1934.  A. L. WEBRE  1,958,078
VACUUM PAN
Filed July 25, 1933  2 Sheets-Sheet 1

Witness:

Inventor
Alfred L. Webre
by
Attorney.

May 8, 1934. A. L. WEBRE 1,958,078

VACUUM PAN

Filed July 25, 1933 2 Sheets-Sheet 2

Witness:

Inventor
Alfred L. Webre
by
Attorney.

Patented May 8, 1934

1,958,078

UNITED STATES PATENT OFFICE 1,958,078

VACUUM PAN

Alfred L. Webre, Merion, Pa., assignor to United States Pipe and Foundry Company, Burlington, N. J., a corporation of New Jersey Application July 25, 1933, Serial No. 682,061

3 Claims. (Cl. 159—25)

My invention relates to the construction of vacuum pans such as are used for the concentration of sugar syrups and the object of my invention is to provide an improved construction which will insure a complete circulation of the syrup under treatment so that substantially all portions of the syrup will pass to the top of the liquid column in the vacuum pan and thence downward into the lower compartment of the pan and upward again through the steam belt. My invention relates to that type of vacuum pans which are divided into upper and lower compartments by a steam belt and provided with means for circulating the liquid contents of the pan through the steam belt into the upper compartment, thence downward into the lower compartment and my invention consists in providing such a vacuum pan with a down-take conduit extending from the upper portion of the upper compartment of the pan downward through the steam belt into the lower compartment and made up of a series of cylinders, the lowermost one of which extends through the steam belt while the upper ones, arranged in tandem with this lower cylindrical element and with each other, are spaced apart so as to provide free openings between the upper compartment of the vacuum pan and the downtake conduit and, further, in providing in the separate cylindrical elements of the down-take conduit screw propellers of substantially equal propulsive capacity working in unison with each other so that each propeller, when fed with the liquid syrup, will tend to propel it downward through the subjacent portions of the down-take conduit in equal volume and with equal velocity and so that the down-take conduit will receive the syrup either through the top of the down-take conduit or through the intermediate openings formed between the separate cylindrical elements of the conduit in accordance with the level of the syrup in the vacuum pan and carry it downward into the lower compartment of the pan with little or no inflow or outflow through the open spaces in the down-take conduit which lie below the space into which the syrup flows from the top of the liquid column.

By preference, I provide in the open spaces between the separate elements of the down-take conduit, vertical vanes for the purpose of counteracting any swirl or rotary movement which the liquid passing through the down-take conduit may be given by the screw propellers and which rotative movement, if excessive, would tend to force the syrup outward through the openings. The above and other features of my invention will be best understood as described in connection with the drawings in which Figure 1 is a vertical sectional elevation of a vacuum pan provided with my improvement.

Figure 2:
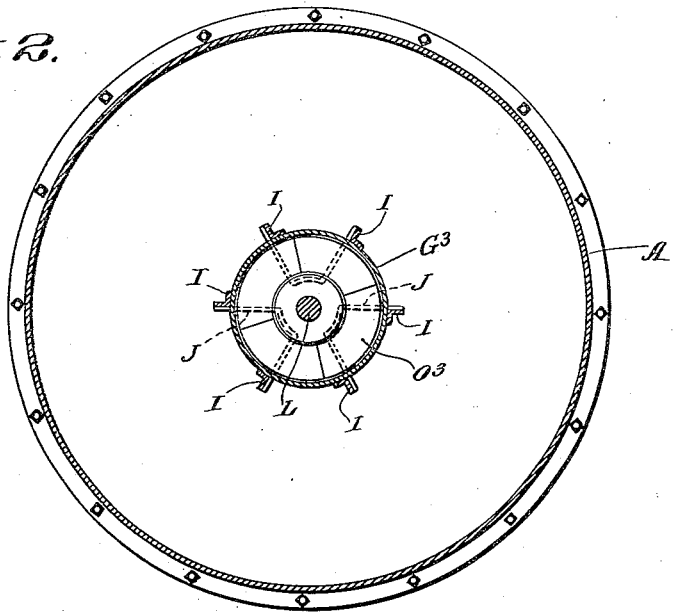

Figure 2, a horizontal section on the line 2—2 of Fig. 1, and

Figure 3:
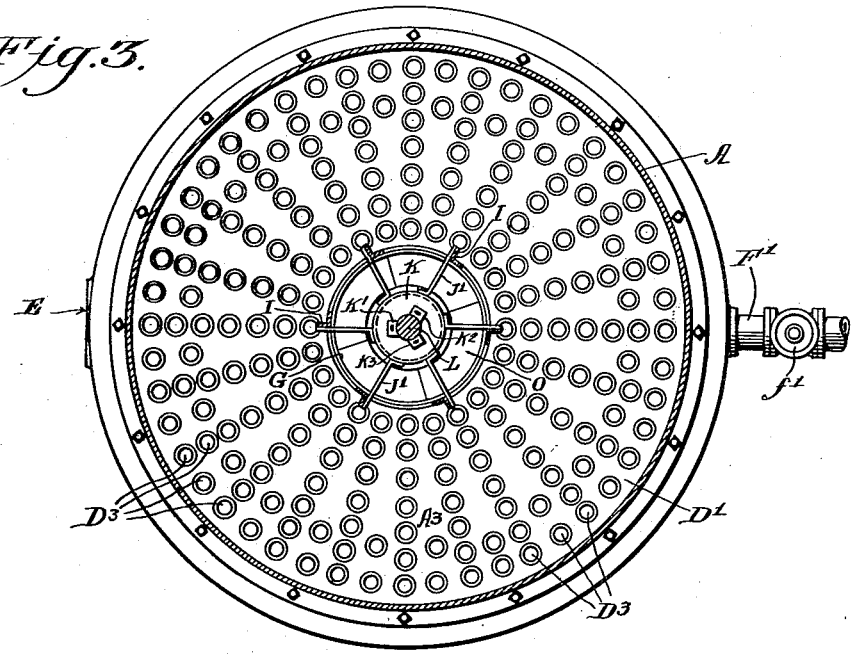

Figure 3, a horizontal section on the line 3—3 of Fig. 1.

A indicates the shell of the vacuum pan which is provided with a hopper shaped bottom $A^1$ from which leads a discharge opening $A^2$. B is a conduit leading through the bottom of the vacuum chamber for the introduction of the syrup to be concentrated. This conduit is provided with a valve $B^1$ and, as shown, has its outlet opening located in a down-take conduit element, indicated at G. C is a vapor conduit leading from the top of the vacuum pan and which, in apparatus of this kind, is connected with a condenser not shown. D is a steam belt which, as shown, has upper and lower tube sheets $D^1$ and $D^2$ connected to the sides of the vacuum pan and to the cylindrical down-take element G. $D^3$, $D^3$, etc., are multiple tubes passing through the steam belt and connected to the upper and lower tube sheets. At E, I have indicated an inlet passage for steam and at F a drain pipe for condensate formed in the steam belt. At $F^1$ I have indicated an outlet conduit from the steam belt which, as described in my United States Patent 1,835,250, may be connected with a vacuum pipe, $f^1$ indicating a valve by which this conduit can be opened and closed. G is a down-take conduit element passing through the steam belt and, as shown, forming the inner wall of the steam belt, connecting, as do the tubes $D^3$, the upper and lower divisions or chambers of the vacuum pan which I have marked respectively as $A^3$ and $A^4$. $G^1$, $G^2$ and $G^3$ are down-take conduit elements, cylindrical in shape, located in the upper chamber of the vacuum pan in tandem relation to the element G and to each other and separated from the element G and from each other by spaces indicated at H, $H^1$ and $H^2$. As shown, the cylindrical down-take elements, other than the lowermost indicated at G, are supported in position by an annular system of columns. Angle irons I, as shown, are secured at their lower ends to the tube sheet $D^1$ and at their upper ends to the top or dome of the vacuum pan. Also secured to the angle iron posts I are vanes extending into the spaces H, $H^1$ and $H^2$. The vanes extending into the spaces $H^1$ and $H^2$ are, as shown, bent into truncated V shape, the outer ends of the bell being secured to adjacent angle irons I, all as shown at J, J, J. The vanes entering the spaces H consist, as shown, of an upper series of vanes of truncated V shape, indicated at J, and a lower series of vanes $J^1$, secured to the angle iron posts at their outer ends and to a ring K at their inner ends and this ring K serves as a support for bearing blocks indicated at $K^1$, $K^2$ and $K^3$ for the shaft to be described. L is a vertical shaft extending downward centrally through the elements of the down-take conduit and supported at its top in a housing M which encloses shaft actuating gearing, not shown, driven by a motor, as indicated at N. The lower portion of this shaft L is centered by the bearing blocks $K^1$, $K^2$ and $K^3$ and to this shaft are secured a series of screw propellers of approximately equal propulsive capacity, one located in each of the cylindrical elements $G^1$, $G^2$ and $G^3$ of the downward conduit, as indicated at O, $O^1$, $O^2$ and $O^3$.

In operation, the syrup to be concentrated is fed to the vacuum pan through the conduit B in such quantity and at such intervals as may be convenient and when the level of the syrup in the vacuum pan is at the desired height, steam is introduced into the steam belt and the shaft L set in rotation which also, of course, rotates the screw propellers O, $O^1$, $O^2$ and $O^3$ and if the level of the syrup is below the top of the down-take conduit element $G^1$, the syrup will be drawn in the down-take conduit through the opening H by the action of the screw propeller O passing downward through the cylindrical element G into the lower chamber $A^4$ of the vacuum pan and upward again through the tubes $D^3$. When the level of the syrup is above the top of the cylindrical down-take element $G^1$, the syrup will be drawn into this conduit by the action of the screw propeller $O^1$ and there will be little or no inflow or outflow through the opening H, as the screw propeller O, having approximately the same propulsive capacity as the screw propeller $O^1$, will draw the syrup across the opening H so that the circulation will be established with the fluid entering the down-take conduit through the opening $H^1$ and with an outflow of the syrup through the annular space formed between the down-take conduit and the walls of the vacuum pan. Again, when the level of the fluid extends above the opening $H^2$, the inflow of the fluid would take place through this opening and when the level of the fluid extends above the level of the element $G^3$ the inflow will occur at the top of this element and in all cases there will be little or no inflow or outflow through the openings in the down-take conduit located below the point of entrance of the syrup to the down-take conduit and in this way I secure at all levels of the syrup in the vacuum pan a complete circulation of the syrup, from a level adjacent to its top level downward through the conduit container into the lower compartment of the vacuum pan and upward through the steam belt and through the annular space between the down-take conduit and the upper walls of the vacuum pan, thus insuring that the syrup, heated in passing through the steam belt, shall reach the top of the liquid column in the vacuum pan, from which top level the vapor is drawn off, thus reducing the temperature of the syrup before it enters the down-take conduit.

The function of the vanes J and $J^1$ located in the spaces between the cylindrical elements of the down-take conduit is to check any swirl or rotating movement which may be given to the syrup, passing through the down-take conduit, by the screw propellers and thus check the tendency which a rotating column of fluid in the down-take conduit would have to flow outward through the openings between the cylindrical elements of the conduit.

It will be understood that when the syrup under treatment in the vacuum pan is brought to a proper consistency, it is discharged through the discharge opening $A^2$ and a further charge of syrup introduced.

Having now described my invention, what I claim as new and desire to secure by Letters Patent, is:

1. In a vacuum pan comprising upper and lower compartments separated by a horizontal steam belt, a downtake conduit extending from the upper part of the upper compartment through the steam belt into the lower compartment, said conduit consisting of a plurality of cylindrical sections arranged in tandem and spaced from each other, in combination with a plurality of screw propellers of similar propulsive capacity located in the individual cylindrical sections of the down-take conduit and means for simultaneously operating said screw propellers.

2. In a vacuum pan constructed as called for in claim 1, the additional constructive feature which consists in locating in the spaces separating the cylindrical elements of the down-take conduit a series of vertical vanes adapted to check rotative movement of the liquid in its passage between cylindrical elements of the down-take conduit.

3. In a vacuum pan comprising upper and lower compartments separated by a steam belt having upper and lower tube sheets, a multiplicity of tubes connected to the upper and lower tube sheets and a central cylindrical conduit passage connecting the upper and lower compartments of the vacuum pan, the combination therewith of a circular series of vertical columns secured to the upper tube sheet of the steam belt and to the top of the vacuum pan, a plurality of cylindrical down-take conduit sections arranged in tandem with the central conduit passage formed through the steam belt and supported on the columns in such manner as to leave open spaces between the individual cylinders making up the down-take conduit, vertical vanes supported by the columns and extending into the spaces between the cylindrical elements of the down-take conduit, screw propellers located in the central passage leading through the steam belt and in the aligned cylinders making up the down-take passage and means for actuating said propellers in unison.

ALFRED L. WEBRE.